W. S. RAIT.
RESILIENT WHEEL.
APPLICATION FILED JUNE 2, 1911.
1,101,881.
Patented June 30, 1914.
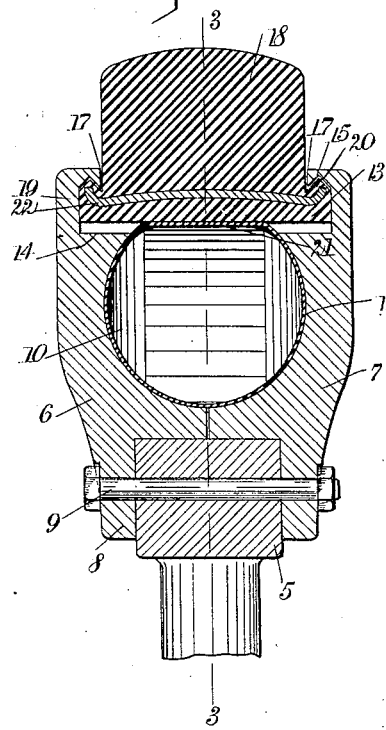
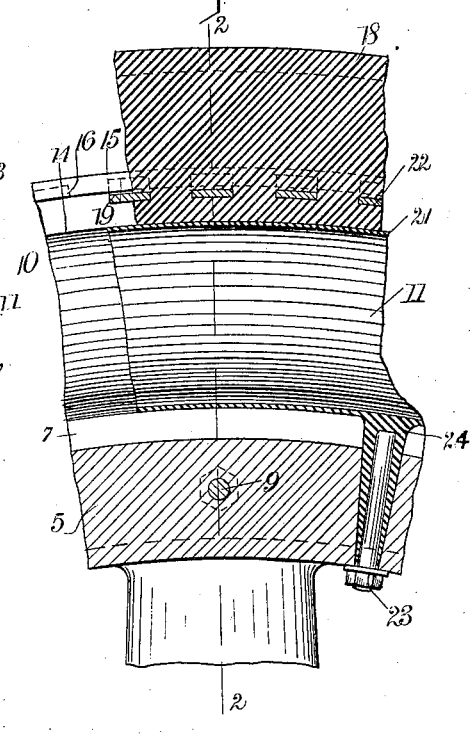
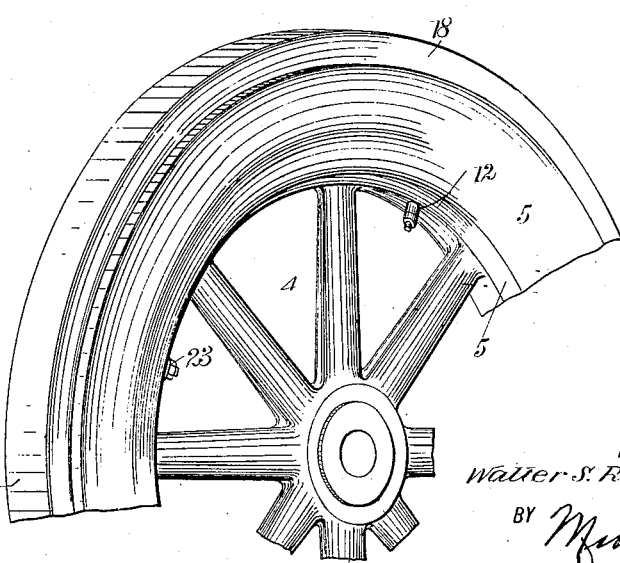
WITNESSES
INVENTOR
Walter S. Rait
BY Munn & Co.
ATTORNEYS

UNITED STATES PATENT OFFICE.

WALTER S. RAIT, OF CHICAGO, ILLINOIS.

RESILIENT WHEEL.

1,101,881. Specification of Letters Patent. Patented June 30, 1914.

Application filed June 2, 1911. Serial No. 630,780.

*To all whom it may concern:*

Be it known that I, WALTER S. RAIT, a citizen of the United States, and a resident of Chicago, in the county of Cook and State of Illinois, have invented a new and Improved Resilient Wheel, of which the following is a full, clear, and exact description.

My invention relates to a new and improved form of resilient wheel, and more particularly relates to means for attaching the outside tire to the rim.

An object of my invention is to attach a tire, preferably of solid construction, to a wheel in such a manner as to obtain all the advantages appearing in a pneumatic tire, but, at the same time, avoiding the possibility of the pneumatic tire being injured or punctured.

A further object of my invention is to provide a wheel construction comprising a resilient member of the above outlined construction, so arranged that the entire cushioning effect of said resilient member will be utilized to support the tire.

A further object of my invention is to provide a tire in a device of the above indicated construction, which tire will be reinforced at its point of greatest strain.

I attain the above outlined objects by constructing the rim of two parts, and in the recess formed by the two parts, I place a pneumatic hollow tube tightly fitting the recess except at its outer portion where it bears against the inside of a solid outer tire, to give a spring to said tire.

With the above and other objects in view, as will more fully hereinafter appear, the present invention consists in certain novel details of construction and arrangement of parts hereinafter fully described, illustrated in the accompanying drawings, and more particularly pointed out in the appended claim.

Reference is to be had to the accompanying drawings, forming a part of this specification, in which similar characters of reference indicate corresponding parts in all the figures, and in which—

Figure 1 is a perspective view showing the upper portion of a wheel having a preferred embodiment of my invention attached thereto; Fig. 2 is a transverse sectional view taken through the rim of said wheel; Fig. 3 is a vertical sectional view taken on the line 3—3 of Fig. 2.

In the separate figures, more particularly Fig. 1, I have shown a wheel 4 of general construction having a felly 5 square in cross section, upon opposite sides of which felly are disposed rims 6 and 7. Each of the rims 6 and 7 has a flanged portion 8 adapted to fit about the square portion 5 and is held to said portion by means of a bolted connection 9. The inner face of each of the rims 6 and 7 is recessed to form a hollow circular cross sectional recess 10, into which is adapted to be disposed a pneumatic tube 11, of rubber or other suitable flexible material, which pneumatic tube is adapted to be filled with compressed air through a nipple 12. As shown at 13, Fig. 2, the outer edge of each of the rims is undercut to form a shoulder 14 a short distance below and parallel with a tangent to the outer circumference of the recess 10. The overhanging edge 15 constituting the outer part of the undercut portion 13 has a series of recesses 16, shown more particularly in Fig. 3, disposed therein, for a purpose hereinafter described.

Adapted to fit between the outer ends 17 of the rims 6 and 7, is an outer tire 18, of any desired construction or material, preferably solid rubber, having ribs 19 extending transversely from each edge, which ribs are adapted to fit within the undercut portion 13, and have extending therefrom projecting ridges 20 adapted to fit within the recesses 16 hereinbefore described, in order to prevent the outer tire from creeping about the wheel. The distance between the shoulder 14 and the overhanging edge 15, is slightly greater than the thickness of the ribs 19, so that there may be some play of the outer rim within the undercut portion 13.

It will be seen that the compressed air within the tube 11 will force the sides of said tube into close engagement with the sides of the rims 6 and 7, and as the outer side of the tube 11 bears on the tire 18, the tendency will be to force this tire outward diametrically until it is stopped by the overhanging portion 15. This will permit the outer tire 18 to ride on the inner tube 11. A shock will be taken by the tire 18 and transmitted to the tube 11, but as this tube is for the most part in snug engagement with the sides of the rims 6 and 7, the entire shock will be taken by the small flattened portion 21 of the tube 11, thereby preventing any loose play or movement of said ring.

Should it be desired to reinforce the outer rim, a series of spaced-apart curved plates 22 may be embedded in the outer rim adjacent its inner side, the ends of said plates projecting into the ribs 19 and are slightly turned upward, as shown in Fig. 2, to clench the rim 18 on the rims 6 and 7.

In case of an accident to the tubular tube 11, the outer rim deprived of its support would ride on the shoulders 14, thereby forming a solid rim tire wheel construction. To prevent the tubular tube 11 from creeping about the rims 6 and 7, there projects from the tube 11 a series of nipples 24 vulcanized to the ring and passing through the felly 5, into each of which nipples extends a bolt 23 from the inner side of the felly, to reinforce the nipple.

While a preferred embodiment of the invention has been described, it is to be understood that many changes could be made in the above construction and many apparently widely different embodiments of this invention could be made without departing from the scope thereof. It is however to be understood that the language used in the following claim is intended to cover the full scope of the invention, and that materials, sizes and relativities of parts are non-essential, except as called for in the claim.

Having thus described my invention, I claim as new and desire to secure by Letters Patent:

In a device of the character described, a rim structure formed with an annular chamber circular in cross section and with a pair of overhanging annular projections, a pneumatic tube arranged in said annular chamber and tending continually to project therefrom, and a tread member pressed by said pneumatic tube and held in place by said annular projections, said tread member comprising a resilient body having laterally projecting annular flanges, and a plurality of spaced transversely positioned metallic rectangular members having outwardly turned ends projecting into said laterally projecting members.

In testimony whereof I have signed my name to this specification in the presence of two subscribing witnesses.

WALTER S. RAIT.

Witnesses:
W. S. ORTON,
PHILIP D. ROLLHAUS.

---

Copies of this patent may be obtained for five cents each, by addressing the "Commissioner of Patents, Washington, D. C."